United States Patent [19]

Sanjurjo et al.

[11] Patent Number: 4,828,814

[45] Date of Patent: * May 9, 1989

[54] PROCESS FOR PURIFICATION OF SOLID MATERIAL

[75] Inventors: Angel Sanjurjo, San Jose; Sylvia Pressacco, Menlo Park, both of Calif.

[73] Assignee: SRI International, Menlo Park, Calif.

[*] Notice: The portion of the term of this patent subsequent to Sep. 16, 2003 has been disclaimed.

[21] Appl. No.: 9,326

[22] PCT Filed: Mar. 7, 1986

[86] PCT No.: PCT/US86/00499

§ 371 Date: Mar. 7, 1986

§ 102(e) Date: Mar. 7, 1986

[87] PCT Pub. No.: WO86/05475

PCT Pub. Date: Sep. 25, 1986

Related U.S. Application Data

[63] Continuation-in-part of Ser. No. 711,584, Mar. 13, 1985, Pat. No. 4,612,179.

[51] Int. Cl.[4] ............... C01B 33/02; C22C 1/04; C21D 1/44; C21D 1/48

[52] U.S. Cl. ............... 423/348; 75/0.5 R; 75/0.5 B; 148/1; 148/13.1; 148/15; 423/290; 423/299; 423/344; 423/345; 423/349; 423/350; 423/440; 423/508; 423/DIG. 12

[58] Field of Search ............... 423/348, 349, 290, 440, 423/345, 299, 508, 344, 350, DIG. 12; 75/65 R, 65 EB, 65 ZM, 93 F, 0.5 R, 0.5 B, 257; 148/1, 13.1, 15

[56] References Cited

U.S. PATENT DOCUMENTS

| | | | |
|---|---|---|---|
| 1,037,713 | 9/1912 | Allen | 423/348 |
| 1,180,968 | 4/1916 | Brockbank | 423/348 |
| 1,386,227 | 8/1921 | Becket | 423/348 |
| 1,518,872 | 12/1924 | Pacz | 423/350 |
| 3,034,886 | 5/1962 | Pruvot et al. | 75/53 |
| 3,148,131 | 9/1964 | Coursier et al. | 423/348 |
| 3,933,981 | 1/1976 | Wakefield et al. | 423/348 |
| 4,172,883 | 10/1979 | Ingle et al. | 423/348 |
| 4,379,777 | 4/1983 | Boulos | 423/348 |
| 4,388,286 | 6/1983 | Kapur et al. | 423/348 |
| 4,612,179 | 9/1986 | Sanjurjo et al. | 423/348 |

FOREIGN PATENT DOCUMENTS

| | | | |
|---|---|---|---|
| 575687 | 2/1959 | Belgium . | |
| 1003223 | 1/1977 | Canada | 75/0.5 B |
| 1170557 | 1/1959 | France . | |
| 1230158 | 9/1960 | France . | |
| 358531 | 10/1981 | United Kingdom . | |

OTHER PUBLICATIONS

A. Sanjurjo, "Silicon Sheet for Solar Cells," Journal of Electrochemical Society, vol. 128, No. 10, Oct., 1981.

L. Nanis, A. Sanjurjo, and S. Westphal, "Fluxing Action of NaF on Oxidized Silicon," Metallurgical Transactions B, vol. 12B, Sep., 1981.

Primary Examiner—John Doll
Assistant Examiner—Lori S. Freeman
Attorney, Agent, or Firm—John P. Taylor

[57] ABSTRACT

A process is disclosed for producing a solid material which, in some cases, may have a resultant purity of 99.999% or better which comprises contacting the solid material at a temperature approaching the melting point of the solid material with a purifying agent which is substantially nonreactive with the solid material to cause the impurities in the solid material to enter the material. After cooling, the purified solid material may be separated from the purifying agent and the impurities therein by leaching.

24 Claims, 2 Drawing Sheets

PROCESS FOR PURIFICATION OF SOLID MATERIAL

This application is a continuation-in-part of U.S. patent application Ser. No. 711,584, filed Mar. 13, 1985 now U.S. Pat. No. 4,612,179.

BACKGROUND OF THE INVENTION
1. Field of the Invention

This invention relates to a process for the purification of a solid material. More particularly, this process relates to a process for purifying a solid material such as a metal, a metalloid, or a metal compound which has been heated to a temperature approaching the melting point of the material to be purified while contacting the heated material with a purifying agent which is substantially non-reactive with the solid material.

2. Description of the Prior Art

There is an increasing demand for high purity materials such as silicon, titanium, boron, gallium arsenide, silicon carbide, etc. for diverse applications such as solar cells, rocket fuel, high purity alloys, semiconductors, and nuclear fuel applications.

For example, an increasing demand for silicon of sufficiently high purity to be suitable for use in the semiconductor and solar cell industries has lead to investigation of many processes to achieve such purity levels. Such processes typically involve some sort of treatment of molten silicon. Purification of a material such as silicon in a molten state is, however, not new. For example, Allen U.S. Pat. No. 1,037,713 describes the purification of silicon by treating molten silicon with metals, such as alkali metals and alkaline earth metals including magnesium.

Brockbank U.S. Pat. No. 1,180,968 describes melting silicon under a slag of natural or artificial silica to eliminate impurities while Pacz U.S. Pat. No. 1,518,872 describes silicon as a valuable byproduct of a reaction between aluminum powder and a metallic fluorosilicate, such as magnesium fluorosilicate.

Pruvot et al U.S. Pat. No. 3,034,886 describes the purification of silicon or ferrosilicons by the injection of silicon fluoride gas into the liquid bath to react with aluminum and calcium impurities to form aluminum and calcium fluorides.

The use of molten metal fluorides for purification of silicon at a temperature of 1000°–1600° C. has been proposed by Coursier et al U.S. Pat. No. 3,148,131. The patentees, however, propose the use of metal fluorides which, in the main, either represent costly materials or materials known to react with silicon to form silicon fluoride and inject impurities in the silicon that are detrimental to its electronic properties.

Boulos U.S. Pat. No. 4,379,777 teaches passing powdered silicon through a plasma which apparently causes migration of the impurities to the surface of the molten silicon particles. After quenching, the particles are acid-leached to remove the surface impurities.

Kapur et al U.S. Pat. No. 4,388,286 combines vacuum refining of silicon with mixing the silicon with an effective fluxing agent, such as a fluoride of an alkali metal or an alkaline earth metal, to form a molten silicon phase and a slag phase.

One of us has also authored or coauthored papers which refer to the purification of molten silicon in contact with NaF in "Silicon Sheet for Solar Cells", by A. Sanjurjo published in the Journal of the Electrochemical Society, Volume 128, pp. 2244–2247 (1981) and "Fluxing Action of NaF on Oxidized Silicon", by L. Nanis, A. Sanjurjo, and S. Westphal published in Metallurgical Transactions B, Volume 12B, pp. 535–573 of the American Society for Metals and the Metallurgical Society of AIME (1981).

Not all prior silicon purification processes, however, involve the melting of silicon. Ingle U.S. Pat. No. 4,172,883 discloses a process for purifying metallurgical grade silicon by heating it to 800° to 1350° C. and contacting it with silicon fluoride gas which is said to react with the impurities causing them to deposit out. The aforementioned Coursier et al patent also speaks of purification temperatures below the melting point of silicon.

It is also known to purify materials such as silicon by acid-leaching of the material in powder form as well as by unidirectional solidification of the material. In the case of silicon, some of these processes may be less expensive than the conventional method for obtaining high purity silicon from chlorosilane reduced - pyrolyzed in $H_2$ to produce pur polycrystalline silicon which can cost as much as 70 times the metallurgical grade silicon starting material. However, most of the other methods proposed either involve high costs or are of limited value in producing a very high purity silicon, such as needed for solar applications, i.e., a purity of 99.999 to 99.9999%.

In the unidirectional solidification method, such as zone melting purification or Czochralski crystal growth, the material is melted and then slowly cooled down in such a way that the heat loss and the solidification occur mostly in one direction. The chemical potential of an impurity in the solid material ($\mu_1$) is higher than in the liquid material. As a consequence, the impurity will migrate toward the area of minimum chemical potential thus establishing a segregation between the solid and the molten phase. This segregation, in turn, results in the purification of the phase in which the impurity has the more positive (higher) chemical potential.

In the slagging method, a molten material to be purified (such as iron) is put in contact with another molten material (such as $CaSiO_3$) called "slag". The slag wets the material to be purified, but is substantially non-reactive to this material. The chemical potential of an impurity in the material to be purified is typically higher than the corresponding chemical potential of the same impurity, or its corresponding ion, in the slag. As a consequence, the impurity will migrate from the molten material to be purified to the slag, thus resulting in purification of the material, e.g., the iron. The degree of purification can be estimated from the difference in the chemical potentials.

SUMMARY OF THE INVENTION

In studying the thermodynamics of these purification reactions, we have discovered that reactions between impurities in solid material and certain purifying agents such as molten slags are more favorable than reactions between the same impurities in the same material when the material is in molten form and contacted with the same purifying agent. Furthermore, we have found that the relative purification power of such purifying agents for a solid material, with respect to same material in liquid form, can be even greater, if the solid material is crushed into smaller particles.

It is, therefore, an object of the invention to provide a process for the purification of a material in solid form in which a purity of 99.999 or better may be achieved in some cases.

It is another object of the invention to provide a process for the purification of a material in solid form to a possible purity of 99.999 or better by heating the solid material to a temperature approaching the melting point of the material and contacting the heated solid material with a purifying agent which is substantially non-reactive with the material to be purified.

It is yet another object of the invention to provide a process for the purification of a material in solid form to a possible purity of 99.999 or better by heating the solid material to a temperature approaching the melting point of the material and contacting the heated material with a purifying agent which is substantially non-reactive with silicon and such that the impurities in the solid material migrate to this purifying agent.

These and other objects of the invention will be apparent from the description which follows.

In accordance with the invention, a process for purifying a material in solid form to a purity as high as 99.9999% comprises contacting the solid material at a temperature approaching the melting point of the material with a purifying agent which is substantially non-reactive with the material to cause the impurities in the solid material to enter the purifying agent.

DESCRIPTION OF THE PREFERRED EMBODIMENTS

The process of the invention provides for the purification of a solid material when heated to just below the melting point of the material in the presence of a purifying agent which is non-reactive with the material to be purified.

As discussed earlier, the chemical potential of an impurity in a solid material ($\mu_I$) is higher than the chemical potential of the same impurity in the same material when the material is in a liquid or molten form. Because of this, the impurity will migrate toward the area of minimum chemical potential thus establishing a segregation between the solid and the molten phase resulting in the purification of the phase in which the impurity has the more positive (higher) chemical potential.

When the material to be purified is in molten form in contact with a purifying agent, i.e., the prior art slagging process, the chemical potential of an impurity in the molten material to be purified is also typically higher than the corresponding chemical potential of the same impurity in the slag. The impurity then migrates from the material to be purified to the slag, thus resulting in purification of the molten material.

Figure 1:
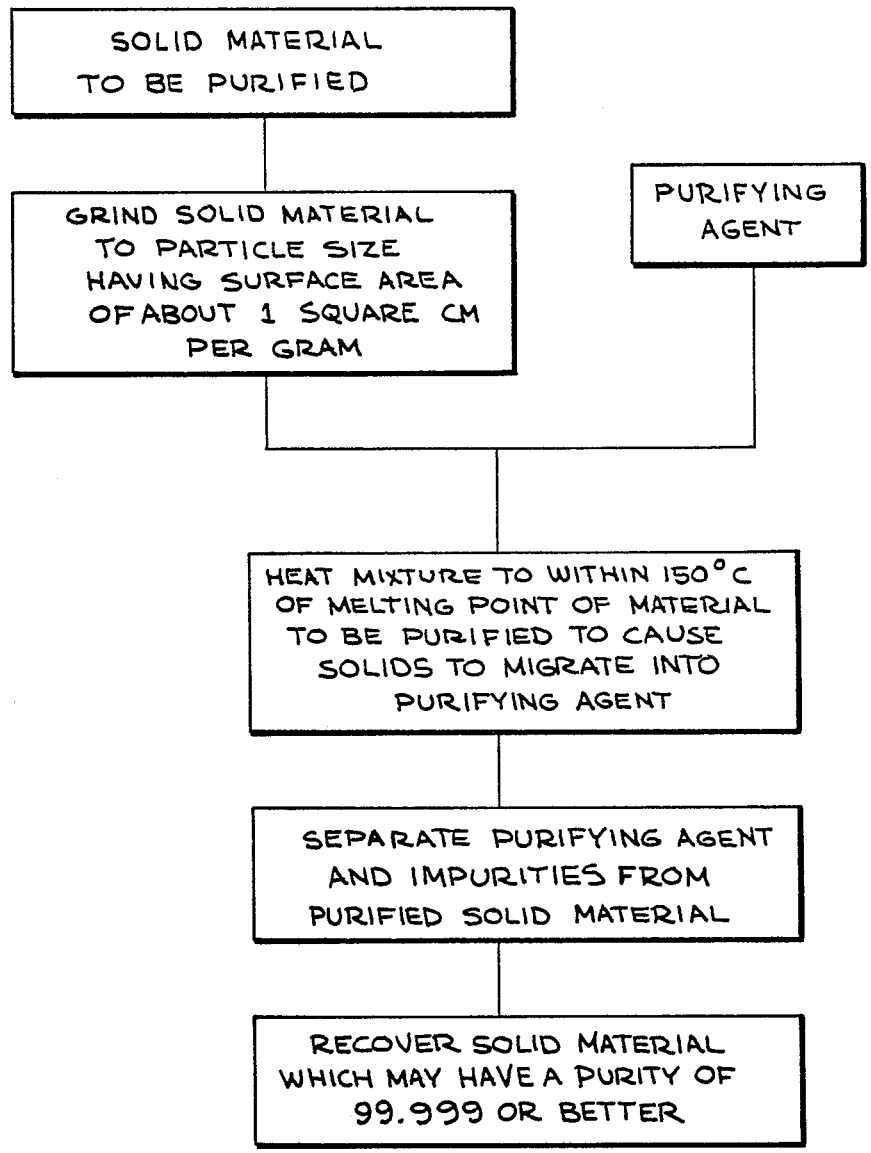
FIG. 1 is a flow sheet illustrating the process of the invention.
Figure 2:
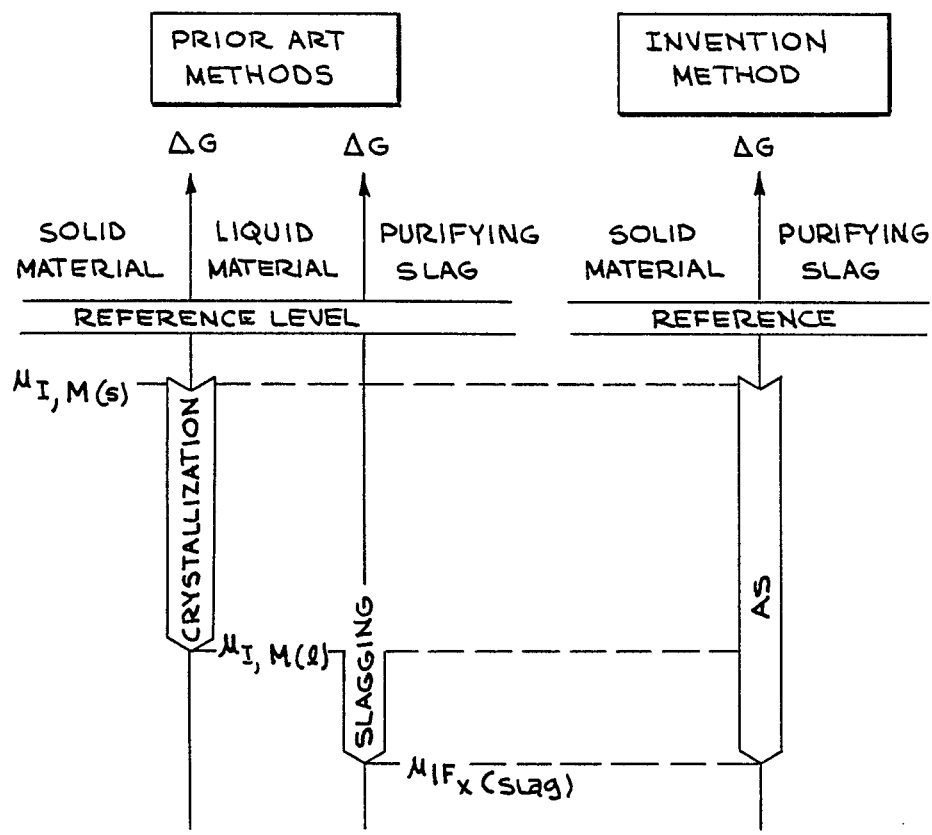
FIG. 2 is a diagram illustrating the thermodynamics of the process in contrast to prior art processes.

Because the chemical potential is a function of state (its value does not depend on the path by which the system reaches a determined state), the thermodynamic principles involved in both of the prior art purification processes (unidirectional solidification and slagging) are utilized in the process of the invention as shown in FIG. 2.

As shown in FIG. 2, the chemical potential levels of an impurity are shown for the process of the invention (labeled as AS for "advanced slagging") and two prior art purification processes which are labeled in the figure, respectively, as crystallization, which equals purification during solidification; and slagging, which is the purification during metallurgical slagging of a molten material.

In the conventional unidirectional solidification (labeled "crystallization" in FIG. 2), the impurities accumulate into the liquid material driven by the difference in chemical potential between the two phases ($\mu_{I,M(l)} - \mu_{I,M(s)}$).

Likewise, during the conventional slagging purification process, some impurities accumulate in the slag driven by the difference in chemical potential $\mu_{IFx(slag)} - \mu_{I,M(l)}$.

In the process of the invention, a solid material to be purified is put in contact with a purifying material such as a slag which may be another solid or a liquid. Some impurities will now accumulate in the purifying agent (slag) driven by the difference in chemical potential of the impurity in the purifying agent and in the material to be purified ($\mu_{IFx(slag)} - \mu_{I,M(s)}$).

It will be noted that this last difference is equal to the sum of the two previous ones. Therefore, the purification power of the process of the invention will be the sum of the conventional solidification plus the conventional slagging processes.

In FIG. 2, the relative magnitude of the driving forces for purification (chemical potentials) of the conventional prior art processes and the process of the invention are shown. In the figure, $\mu_{I,M(s)}$ is the chemical potential of impurity I in material M in a solid state. $\mu_{I,M(l)}$ is the chemical potential of impurity I in material M in a liquid state. $\mu_{IFx(slag)}$ is the chemical potential of impurity I (in the original material) reacted with the slag to form a compound IFx.

For example, if one assumes that the purifying agent is NaF, an impurity such as iron in the material to be purified will form $FeF_2$ in the NaF. Under conventional methods, one would show two separate equilibrium: (a) solid versus liquid material representing unidirectional solidification; and (b) liquid material versus slag.

The solid material to be purified may comprise any one of a number of materials, including metals, metalloids, and metal compounds. Examples of metals include titanium, vanadium, chromium, manganese, iron, cobalt, nickel, copper, gallium, sodium, and zirconium. Examples of metalloids include boron, germanium, and silicon. Examples of metal compounds include gallium arsenide, gallium aluminum arsenide, indium phosphide, copper indium selenide, boron nitride, silicon nitride, tungsten carbide, and silicon carbide.

In each case, however, the particular material to be purified must, in accordance with the invention, be contacted in solid form, at a temperature approaching the melting point of the material to be purified, with a purifying agent in which the impurity to be removed from the solid material has a lower chemical potential than the impurity has in the solid material.

The expression "approaching the melting point of the material to be purified" is intended to mean that the temperature at which the purification process is carried out should be a temperature within at least about 300° C. of the melting point of the solid material to be purified. Preferably, the temperature should be within about 200°, more preferably within about 150° C., and most preferably within about 100° C. of the melting point of the material to be purified, but always below the melting point.

For example when silicon, which melts at a temperature of 1420° C., is to be purified, the temperature of the silicon should be at least about 1120° C. or higher, preferably 1220° C., and more preferably at least 1270° C. While it is theoretically possible to purify the material at a lower temperature, the excess time necessary to obtain sufficient migration of the impurities from the solid material to the surface and then into the purifying agent would not be very practical.

The solid material is preferably comminuted into fine particle form, e.g., to a particle size range of equal to or smaller than 0 1 to 1 millimeter in at least one direction, i.e., preferably smaller than the grain size in the solid material, e.g., metallurgical grade silicon, to thereby expose most of the grain boundaries in which much of the impurities in the solid material will be concentrated. This increases the surface area of the material to be purified and reduces the time needed for impurities in the bulk of the material to diffuse to the surface where they can react and/or become dissolved in the purifying agent. The purification process may also be enhanced by the use of the solid material in particulate form due to the exposure of the grain boundaries of adjacent grains in the polycrystalline material and the tendency of the impurities to concentrate along the grain boundaries of adjacent crystals during solidification of the material.

Although the use of comminuted particles of the solid material is preferred, it will be understood that, alternatively, thin sheets or a ribbon of the solid material, or even sponge-type high porosity materials can be used instead of crushed particles to provide a high surface area exposed to the molten purifying agent. Whatever form is used, the solid material should, preferably be in a form wherein the ratio of surface area to weight is at least about 1 cm$^2$ per gram or higher.

The purifying agent may comprise a reagent grade of any material, which is substantially non-reactive with the material to be purified and, preferably, having a melting point below the melting point of the material to be purified. In one embodiment, the purifying agent is in molten form. By the term "substantially non-reactive" is meant less than 1 percent, preferably less than 0.1 percent, more preferably less than 0.01 percent, and most preferably less than 0.001 percent of the solid material will react with the purifying agent at the purification temperature used.

To be effective, however, the particular purifying agent must be further selected to be one to which the impurity or impurities to be removed from the solid material will preferably migrate, i.e., the chemical potential, in the purifying agent, of the impurity which is to be removed, must be lower (more negative) than the chemical potential of the impurity in the solid material.

Thus, it will be noted that the process of the invention, while very effective in removing certain undesired impurities from a material to be purified, may be ineffective in removing other impurities when the chemical potential of the impurity in the purifying agent is higher than in the material to be purified. However, it should be noted that, in such cases, the process of the invention may be used in conjunction with other prior art purification processes to achieve the desired level of purity.

In other instances, where it is desired to remove a mixture of impurities present in a material, this may involve a multiple purification process in which different purifying agents are selectively used to remove certain impurities and this should be deemed to be within the scope of the invention.

The purifying agent must have a boiling point sufficiently high to permit operation of the process at a temperature approaching the melting point of the solid material to be purified without loss of the purifying agent by volatilization. Preferably, the purifying agent will have a boiling point above the melting point of the solid material to be purified. The use of a purifying agent with a low boiling point will be found to be unduly restrictive with respect to the temperature at which the purification process may be conducted.

Examples of purifying agents which may be used in the purification of silicon, for example, therefore, include those purifying agents having boiling points at least above 150° C. below the melting point of the solid material to be purified selected form the class consisting of silica, silicates of alkali metals and alkaline earth metals, and halides of alkali metals and alkaline earth metals.

Further, by way of example, in the purification of silicon (which melts at 1420° C.) the purifying agent should have a boiling point above 1270° C. Thus, for example, cesium fluoride, which has a boiling point of 1250° C., would be excluded from such a list of useful purifying agents. Preferably, however, the purifying agent will have a boiling point above the melting point of silicon to permit the maximum flexibility in processing conditions.

Thus, for example, in a preferred example, the purification of silicon involves the initial provision of a source of silicon which is preferably crushed into particulate form, heated to a temperature approaching the melting point of the silicon, and then contacted at this temperature with a purifying agent, preferably in molten form, which will extract the impurities without substantially reacting with the silicon, cooling the mixture, and then separating the impurity-rich purifying agent leaving silicon having a purity of 99.999 or better.

The material used in the process may be an already partially purified material or may be a reagent grade material. For example, when silicon is to be purified, preferably, metallurgical grade silicon or better is used as the starting material. Preferably, the starting material should be at least 98–99% pure.

Prior to the purification step, the particulate material may be optionally prepurified in an acid leaching step, for example, in the case of silicon, with an acid mixture, such as $HNO_3$—HF or $H_2O_2$—HF for a period of 10–60 minutes. The temperature may vary from room temperature to slightly under the boiling point of the acid mixture. If higher temperatures are used, the reaction time should be correspondingly shortened.

The solid material is mixed with the purifying agent in a ratio of from 0.1:2 to 2:1, preferably about 1:1. As previously discussed, the purifying agent is selected to be a material which will react with the typical impurities found in the solid material but will be substantially non-reactive with the solid material. For example, when solid silicon is the material to be purified, the purifying agent will be selected to extract impurities such as boron, phosphorus, iron, and aluminum and, to a lesser extent, calcium, chromium, and nickel from the solid silicon, but will be substantially non-reactive with solid silicon.

When solid silicon is to be purified, the purifying agent may comprise an oxide of silicon, including silicon oxide or a silicate or halide of lithium, sodium, potassium, magnesium, strontium, calcium, or barium which substantially is non-reactive with silicon. Especially preferred materials are $SiO_2$, NaF, and $Na_2SiO_3$ both because of their effectiveness and the material cost.

As previously stated, the purifying agent should be at least of reagent grade purity. However, in one embodiment, when purifying silicon, the purifying agent may be preselected to contain a doping agent for the silicon in an amount to permit tailoring of the resistivity of the final purified silicon product.

The purifying agent is preferably ground to a particle size range approximating the particulate solid material to be purified to facilitate thorough mixing of the materials. The particulate solid material and purifying agent are then heated to a temperature approaching the melting point of the solid material to be purified. In the case of silicon, this temperature will more preferably be at least about 1270° C. and, most preferably, from 1320° C. to just under 1420° C.

The mixture is placed in a containment vessel which will not react with the solid material or cause impurities therein to migrate into the solid material at the purification temperature. When silicon is to be purified, for example, such a vessel may comprise a $SiO_2$, SiC or $Si_3N_4$ material or at least a vessel lined with one of these materials. A graphite vessel may also be used under certain circumstances where the carbon will not react with the silicon, e.g., in the presence of a NaF purifying agent.

The materials are held at the purification temperature for a period of time which may range from as short as 15 minutes to as long as 3 hours depending upon the reactivity of the molten purification agent. For example, when using $SiO_2$, such as silica gel, a time period of 3 hours may be used while NaF can be used for 15 minutes or $Na_2SiO_3$ for 30 minutes.

The purifying agent may be added and removed continuously until the desired purification has been achieved. In general, the mixture is then cooled to room temperature, and the now purified material may be recovered by leaching the solidified mixture with a reagent which is a solvent for the impurity-rich purifying agent but which will not appreciably attack the purified material.

Concentrated, or at least 5%, HF has been found to be a satisfactory leaching agent when purifying silicon. The leaching agent should preferably be at least as pure as the final desired purity of the silicon to avoid introduction of contamination after the high temperature purification step. An electronic grade HF is satisfactory in a final leach although less pure, i.e., commercial grade, HF can be used in a first leach. After leaching, the purified silicon is recovered by separating the solid silicon from the now solubilized purification agent, such as by decantation or filtration.

In a preferred embodiment, when silicon is to be purified, sodium fluoride is used as the molten purifying agent. However, when a sodium-containing liquid purifying agent is used, it will be necessary to separately remove sodium in a subsequent purifying step. In such instances, after extraction of the purified material, e.g., after leaching, the purified silicon may be subject to a further purification step to remove sodium. This may be accomplished by heating the silicon in vacuum to a temperature of 800° C. or higher for about 5 to 60 minutes minutes. Alternatively, the sodium may be oxidized and then the oxide layer removed by leaching in HF.

While we do not wish to be bound by any theories of operation, the success of our process appears to be related to the more negative or lower partial chemical potential of impurities in a molten purifying agent such as sodium fluoride than in a solid material being purified such as solid silicon; thus making the impurities more stable in the molten purifying agent.

The process of the invention may also be operated on a continuous basis if desired wherein at least the solid material and, preferably the purifying agent as well, are continuously fed into a reactor and the treated materials continuously removed from the reactor.

For example, solid silicon can be continuously fed through a pool of molten purifying agent as a sheet thus permitting direct use of the purified silicon product in the manufacture of electronic devices, such as solar cells.

The following examples will serve to illustrate the process of the invention:

EXAMPLE I

Metallurgical grade silicon with a particle size of less than 1 mm was heated with an equal amount of spectrographic grade $SiO_2$ gel in a graphite crucible to 1360° C. for 180 minutes under an Ar atmosphere. After cooling to room temperature, the $Si-SiO_2$ mitture was leached with concentrated HF. The impurities (in parts per million) of the initial metallurgical grade silicon and the purified silicon are shown in Table 1.

TABLE I

|    | $SiO_2$ Gel | Silicon Before Treatment | Silicon After $SiO_2$ Treatment |
| --- | --- | --- | --- |
| Mg | 20 | 35 | <6 |
| Ca | 15 | 40 | 7 |
| Ba | <10 | 17.5 | 10 |
| Ti | <12 | 250 | 12 |
| Zr | <35 | 75 | <35 |
| V  | <25 | 50 | <25 |
| Cr | <7 | 800 | <7 |
| Mo | <35 | — | — |
| Mn | <8 | 300 | <8 |
| Fe | <20 | 2800 | <20 |
| Ni | <8 | 30 | 8 |
| Cu | <4 | 80 | 50 |
| B  | <30 | <30 | — |
| Al | <0 | 1300 | 100 |
| P  | <4500 | <4500 | <4500 |

(Impurities in parts by million by weight)

EXAMPLE II

The same silicon as in Example I was mixed with an equal amount of reagent grade $Na_2SiO_3$. The mixture was heated in a graphite crucible at 1360° C. for 30 minutes under an Ar atmosphere. After cooling, the mixture of $Si-Na_2SiO_3$ was leached with concentrated HF. The impurities (in parts per million) of the initial metallurgical grade silicon and the purified Si are shown in Table 2.

TABLE 2

|    | Silicon Before Treatment | Silicon After $Na_2SiO_3$ Treatment |
| --- | --- | --- |
| Mg | 35 | 17.5 |
| Ca | 40 | 15 |
| Ba | 17.5 | <10 |
| Ti | 250 | <12 |
| Zr | 75 | <35 |
| V  | 50 | 25 |
| Cr | 800 | <7 |

TABLE 2-continued

|  | Silicon Before Treatment | Silicon After Na2SiO3 Treatment |
|---|---|---|
| Mn | 300 | <8 |
| Fe | 2800 | <20 |
| Ni | 30 | 8 |
| Cu | 80 | 80 |
| B | <30 | <30 |
| Al | 1300 | 150 |
| P | <4500 | <4500 |

(Impurities in parts by million by weight)

To illustrate that even higher purity levels can be achieved using this process when the starting materials are of higher purity, and that this process results in higher purification than conventional processing of liquid silicon, we performed the following experiments.

EXAMPLE III

Twenty grams of silicon powder (semiconductor grade from Ventron) were ground to a particle size of less than 1 mm and mixed with Ultrapure NaF (CERAC) of similar particle size in a weight ratio of 1:1.

The mixture was placed in a graphite crucible and heated in a RF induction furnace for 15 minutes at 1300° C. so that the solid silicon was in contact with molten NaF. A second sample was heated at 1450° C. for 10 minutes to melt both the NaF and the silicon. The samples were then cooled to room temperature, and the silicon was separated from the NaF in each sample by aqueous leaching followed by decantation and filtering. The resulting purified silicon, as well as the original silicon and NaF and the final NaF product were analyzed by Spark Source Spectrography. The results, in parts per million, are listed in Table 3 below:

TABLE 3

|  | REACTANTS | | PRODUCTS | | |
|---|---|---|---|---|---|
|  | Si | NaF | Si (Melted) | Si (Solid) | NaF (After Leach) |
| B | 0.8 | 0.1 | 1 | 0.02 | 2 |
| P | 0.3 | 1 | 0.2 | 0.05 | 0.1 |
| Al | 3 | 0.07 | 1 | 0.5 | 0.7 |
| As | <0.05 | 0.08 | 0.05 | <0.05 | 0.0 |
| Ti | <0.16 | <0.15 | <0.08 | <0.16 | <0.16 |
| Zr | <0.24 | <0.14 | <0.1 | <0.24 | 0.05 |
| V | 0.04 | — | <0.04 | <0.04 | — |
| Cr | 0.2 | 0.08 | 1 | <0.2 | 0.4 |
| Mn | 0.4 | 0.06 | 2 | 0.04 | 1 |
| Fe | 40* | 0.6 | 40* | 3 | 4 |
| Ni | — | <0.2 | — | — | 0.2 |
| Cu | <0.1 | 0.06 | — | 0.07 | 0.5 |
| Na | <0.1 | — | 820 | 6 | — |
| K | — | 4 | <0.04 | <0.04 | 0.2 |
| Ca | 7 | 0.5 | 0.4 | 4 | 1 |
| Mg | 6 | 7 | 5 | 2 | 2 |

*Heterogeneous
(Impurities in parts by million by weight)

EXAMPLE IV

Germanium may also be purified by the process of the invention by exposing it at an elevated temperature of just under 937° C. (the melting point of germanium) to a purifying agent such as NaBr, Kbr, BAI2, or CsI which are all liquid at 937° C. to remove many impurities, except silicon and boron, as illustrated in the table below. Natively grown GeO2 or SiO2 may also be used as purifying agents for germanium. The approximate segregation coefficients for common impurities for common impurities in germanium are listed in the table below.

TABLE 4

| Element | Segregation Coefficient |
|---|---|
| Bi | $5 \times 10^{-5}$ |
| Pb | $1 \times 10^{-4}$ |
| In | $1 \times 10^{-2}$ |
| As | $1 \times 10^{-1}$ |
| Sn | $1 \times 10^{-1}$ |
| Ga | $1 \times 10^{-1}$ |
| Al | $1 \times 10^{-1}$ |
| P | 0.2 |
| Si | 10 |
| B | 30 |

Titanium may be purified similarly to silicon using purifying agents such MgF2 or BaF2. the use of fluorides also permits decreasing the amount of oxygen in titanium by the formula:

$$TiO_2(\text{in Ti}) + MgF_2(l) \rightarrow TiF_2(g) + 2MgO(\text{in MgF}_2)$$

The reaction goes through an intermediate formation of fluorooxytitanates and fluorotitanates which at the end decompose to give TiF2 vapors. The net effect is that oxygen is pumped out of the titanium into the purifying agent giving the purified titanium superior mechanical characteristics.

Gallium may be purified by the process of the invention to remove impurities such as Ag, Mg, In, Pb, and Sn which may have more negative chemical potentials in liquid rather than solid phase materials.

Gallium arsenide may be purified in accordance with the practice of the invention to remove most impurities with the exception of beryllium by heating small particles of gallium arsenide in the presence of a purifying agent. Purifying agents useful in the purification of gallium arsenide may include $B_2O_3$, $Ga_2S_3$ (M.P.=1255° C.), $Na_2Ga_2S_4$ (M.P.=952° C.), gallates such as $NaGaO_2$, or complex gallium solids such as $Ba_3(GaF_6)_2$, $LiGaF_6$, or $CsGaCl_4$ (M.P.=385° C.), or mixtures thereof.

Thus, the invention provides a novel process for the purification of a solid material by contacting it at an elevated temperature approaching the melting point of the solid material with a purifying agent which is substantially unreactive with the solid mateial and into which the impurities in the solid material will preferentially migrate.

Having thus described the invention, what is claimed is:

1. A process for purifying a solid material comprising contacting said solid material at a temperature approaching the melting point of said solid material with a purifying agent in molten from which is substantially non-reactive with said solid material causing the impurities in said solid material to enter said purifying material.

2. The process of claim 1 where said purification step is carried out at a temperature not more than 300° C. below the melting point of said solid material.

3. The process of claim 2 where said purification step is carried out at a temperature not more than 200° C. below the melting point of said solid material.

4. The process of claim 3 where said purification step is carried out at a temperature not more than 150° C. below the melting point of said solid material.

5. The process of claim 4 where said purification step is carried out at a temperature not more than 100° C. below the melting point of said solid material.

6. The process of claim 1 including the step of providing said solid material in particulate form having an average particle size with at least 1 dimension smaller than 1 mm.

7. The process of claim 6 including the step of grinding said solid material to an average particle size of less than 1 mm.

8. The process of claim 1 including the step of providing said solid material in a form wherein the surface area to weight ratio of said solid material is at least 1 cm$^2$ per gram.

9. The process of claim 1 wherein said solid material to be purified is silicon and said purifying agent is selected from the class consisting of silica, a silicate of lithium, sodium, potassium, magnesium, strontium, calcium, or barium; a halide of lithium, sodium, potassium, magnesium, strontium, calcium or barium; or mixtures thereof.

10. The process of claim 9 wherein said purifying agent is $SiO_2$.

11. The process of claim 9 wherein said molten purifying agent is selected from the class consisting of silicates of lithium, sodium, or potassium.

12. The process of claim 9 wherein said molten purifying agent is selected from the class consisting of a fluoride or chloride of lithium, sodium, potassium, magnesium, strontium, calcium, or barium.

13. The process of claim 1 including heating said solid material to be purified and said purifying agent in a vessel having a material in contact with said solid material which is substantially non-reactive with said solid material at the purification temperature.

14. The process of claim 1 wherein said step of contacting said solid material at a temperature approaching the melting point of said solid material with a purifying agent which is substantially non-reactive with said solid material is carried out for a period of time of from 15 minutes to 3 hours.

15. The process of claim 1 wherein the steps of the process are repeated at least 1 additional time to increase the purity of the final solid material product.

16. The process of claim 1 including the steps of continuously feeding a particulate mixture of said solid material and said purifying agent into a reactor and continuously removing purified solid material and purifying agent from said reactor.

17. The process of claim 1 including the further step of providing in said purifying agent a doping agent.

18. The process of claim 1 including the step of passing said solid material as a thin sheet through a molten bath of said purifying agent whereby the purified sheet may be used directly in the manufacture of an electronic device, such as a solar cell.

19. The process of claim 1 wherein said purifying agent is selected from the class consisting of purifying agents having boiling points at least above 150° C. below the melting point of the solid material to be purified.

20. The process of claim 19 wherein said purifying agent is selected from the class consisting of purifying agents having boiling points above the melting point of the solid material to be purified.

21. A process for removing impurities from a solid material comprising:
    (a) providing said solid material in a form wherein the surface area to weight ratio of said solid material is at least 1 cm$^2$ per gram;
    (b) contacting said solid material at a temperature within 300° C. of the melting point of said solid material for from about 15 minutes to about 3 hours with a molten purifying agent in which the impurity to be removed from said solid material has a lower chemical potential than the impurity has in said solid material, said purifying agent being substantially non-reactive with said solid material, whereby said impurities in said solid material enter said molten purifying material; and
    (c) separating said purified solid material from said purifying agent containing impurities removed from said solid material.

22. The process of claim 21 wherein said solid material to be purified is selected from the class consisting of titanium, zirconium, vanadium, chromium, manganese, iron, cobalt, nickel, copper, gallium, sodium, boron, germanium, silicon, gallium arsenide, indium phosphide, copper indium selenide, silicon nitride, boron nitride, tungsten carbide, and silicon carbide.

23. The process of claim 21 wherein said solid material comprises silicon and said molten purifying agent is selected from the class consisting of silica, a silicate of lithium, sodium, potassium, magnesium, strontium, calcium, or barium; a halide of lithium, sodium, potassium, magnesium, strontium, calcium or barium; or mixtures thereof.

24. A process for purifying silicon comprising:
    (a) prepurifying solid silicon in an acid leach;
    (b) heating said prepurified solid silicon to a temperature below the melting point of silicon;
    (c) contacting said heated solid silicon with a purifying agent which is substantially non-reactive with silicon; and
    (d) causing the impurities in the silicon to enter the purifying material.

* * * * *